United States Patent
Phelps et al.

(10) Patent No.: US 8,043,658 B2
(45) Date of Patent: Oct. 25, 2011

(54) RESISTIVE HEATER GEOMETRY AND REGENERATION METHOD FOR A DIESEL PARTICULATE FILTER

(75) Inventors: Amanda Phelps, Malibu, CA (US); Kevin W. Kirby, Calabasas Hills, CA (US); Daniel J. Gregoire, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 11/868,696

(22) Filed: Oct. 8, 2007

(65) Prior Publication Data

US 2009/0090089 A1  Apr. 9, 2009

(51) Int. Cl.
    *B01D 39/00* (2006.01)
(52) U.S. Cl. ... 427/244; 55/523; 55/DIG. 5; 55/DIG. 30
(58) Field of Classification Search ............ 55/522–524, 55/282.3, DIG. 30, DIG. 5; 422/169–182, 422/244; 60/297; 502/303
See application file for complete search history.

(56) References Cited

U.S. PATENT DOCUMENTS

| | | | |
|---|---|---|---|
| 3,995,143 A * | 11/1976 | Hervert | 219/553 |
| 4,883,300 A | 11/1989 | Akagawa | |
| 4,897,096 A * | 1/1990 | Pischinger et al. | 55/283 |
| 5,317,132 A * | 5/1994 | Clough et al. | 219/543 |
| 5,480,622 A * | 1/1996 | Narula et al. | 422/174 |
| 5,851,591 A | 12/1998 | Brandt | |
| 6,873,790 B1 | 3/2005 | Cooper et al. | |
| 6,889,425 B2 | 5/2005 | Goetz | |
| 7,112,233 B2 | 9/2006 | Ohno et al. | |
| 2004/0083691 A1* | 5/2004 | Kong | 55/282.3 |
| 2004/0202589 A1* | 10/2004 | Raybould | 422/177 |
| 2007/0062181 A1* | 3/2007 | Williamson et al. | 60/297 |
| 2007/0227104 A1* | 10/2007 | Gonze et al. | 55/282.3 |

* cited by examiner

*Primary Examiner* — Duane Smith
*Assistant Examiner* — Amber Orlando
(74) *Attorney, Agent, or Firm* — Reising Ethington P.C.

(57) ABSTRACT

One embodiment of the invention includes a diesel particulate filter comprising a first face and a second face; a bottom electrode layer formed over the first face of the diesel particulate filter; a middle resistive layer formed over a portion of the bottom electrode layer; and a top electrode layer formed over a portion of the middle resistive layer.

8 Claims, 4 Drawing Sheets

RESISTIVE HEATER GEOMETRY AND REGENERATION METHOD FOR A DIESEL PARTICULATE FILTER

The invention claimed in this application was made under Government contract No. DE-FC04-03AL67635 with the U.S. Department of Energy, in which the government may have rights.

TECHNICAL FIELD

The field to which the disclosure generally relates includes diesel particulate filter regeneration.

BACKGROUND

Diesel engines have higher efficiency than gasoline engines due to the increased compression ratio of the diesel combustion process and the higher energy density of diesel fuel. As a result, a diesel engine provides improved gas mileage over an equivalently sized gasoline engine.

The diesel combustion cycle produces soot (diesel particulates) that is typically filtered from the exhaust gases. A diesel particulate filter (DPF) is usually disposed along the exhaust stream to filter the soot from the exhaust. In one type of DPF, the filter is a honeycomb filter. Over time, the soot builds up in the DPF and the DPF must periodically be regenerated to remove the entrapped soot. One method of regeneration is to burn the soot within the DPF to enable the DPF to continue its filtering function.

The temperature of diesel exhaust during normal operation, for example 150-250° C., is considerably lower than what is required to thermally regenerate a saturated DPF. To initiate a self-propagating particulate combustion event, temperatures in the approximate range of 550-850° C. must be achieved. Consequently, some method for raising the DPF temperature beyond what is encountered in the exhaust must be employed during the regeneration cycle.

Some methods known in the art for raising the DPF temperature include indirectly raising the temperature of the DPF by increasing the temperature of the exhaust gas, for example, through catalytic oxidation of excess fuel or through electrical heating of an element upstream of the DPF. However, in either of these two approaches, not all of the heat transferred to the exhaust gas is transferred to the DPF. Much of the exhaust gas passes through the DPF with incomplete heat transfer, creating a large inefficiency. Moreover, for the fuel burner, the inefficiency is compounded by the creation of additional particulate and hydrocarbon emissions, a lower exhaust oxygen concentration, and shorter lifetimes for the DPF due to cracking from thermal gradients.

Another method known in the art for raising the temperature of the DPF to the particulate combustion temperature is through microwave heating of a DPF made from a suitably absorbing ceramic material. To achieve this, either the entire DPF or at least selected regions of the DPF must be made of a material that is able to absorb microwave energy at the frequency of operation. For example, the entire DPF may be made from an expensive microwave absorbing ceramic material such as SiC, or a standard cordierite DPF may be selectively coated with an absorbing material. In both cases, parasitic absorption of microwave energy by the particulates effectively reduces the regeneration efficiency to an intolerable level.

SUMMARY OF EXEMPLARY EMBODIMENTS OF THE INVENTION

One embodiment of the invention includes a diesel particulate filter comprising a first face and a second face; a bottom electrode layer formed over the first face of the diesel particulate filter; a middle resistive layer formed over a portion of the bottom electrode layer; and a top electrode layer formed over a portion of the middle resistive layer.

Other exemplary embodiments of the invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings.

DETAILED DESCRIPTION OF EXEMPLARY EMBODIMENTS

The following description of the embodiments is merely exemplary in nature and is in no way intended to limit the invention, its application, or uses.

Figure 1:
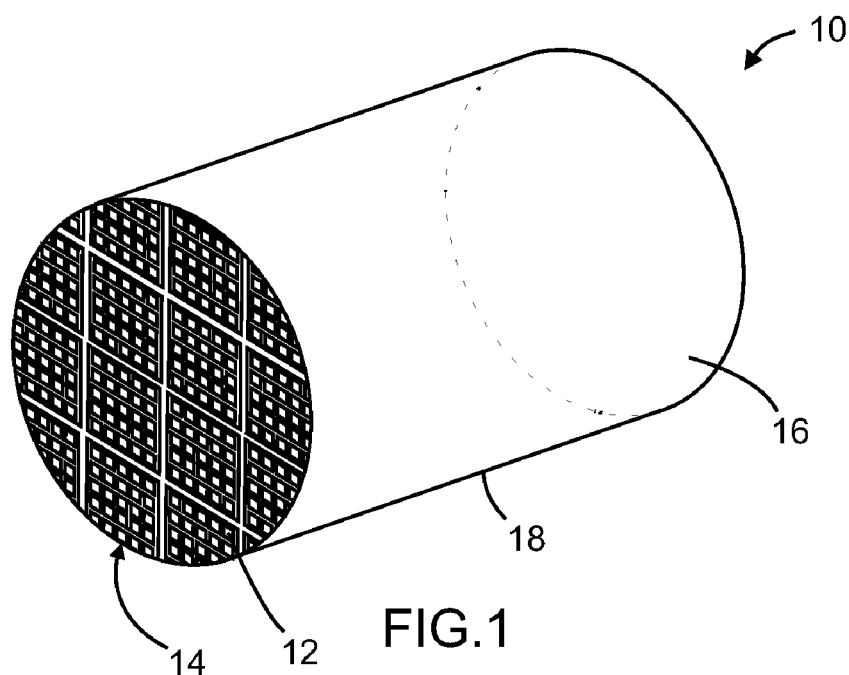
FIG. 1 illustrates a diesel particulate filter, according to one embodiment of the invention.

According to one embodiment of the invention, the DPF 10 may be a wall flow filter as shown in FIG. 1. The DPF 10 may be commercially available, for example, from Corning under the trade name Duratrap. The filter may be a honeycomb structure having a plurality of channels 12 running the length of the structure. The filter may comprise an extruded ceramic such as, but not limited to, cordierite or silicon carbide. The channels may have square or rectangular cross-sections. In one embodiment, there are approximately 4400 channels formed in the DPF 10. In one embodiment, the open area of the square channels has the dimensions of ~0.080"×0.080", while the channel walls are ~0.017-0.020" thick. Approximately half of the channels may be closed over a first face 14 of the DPF 10 and the alternate half of the channels may be closed over a second face 16 of the DPF 10, forming a checkerboard pattern over each of the first face 14 and the second face 16 of the DPF 10. The DPF 10 has an outer surface 18 that may be cylindrical.

Figure 2:
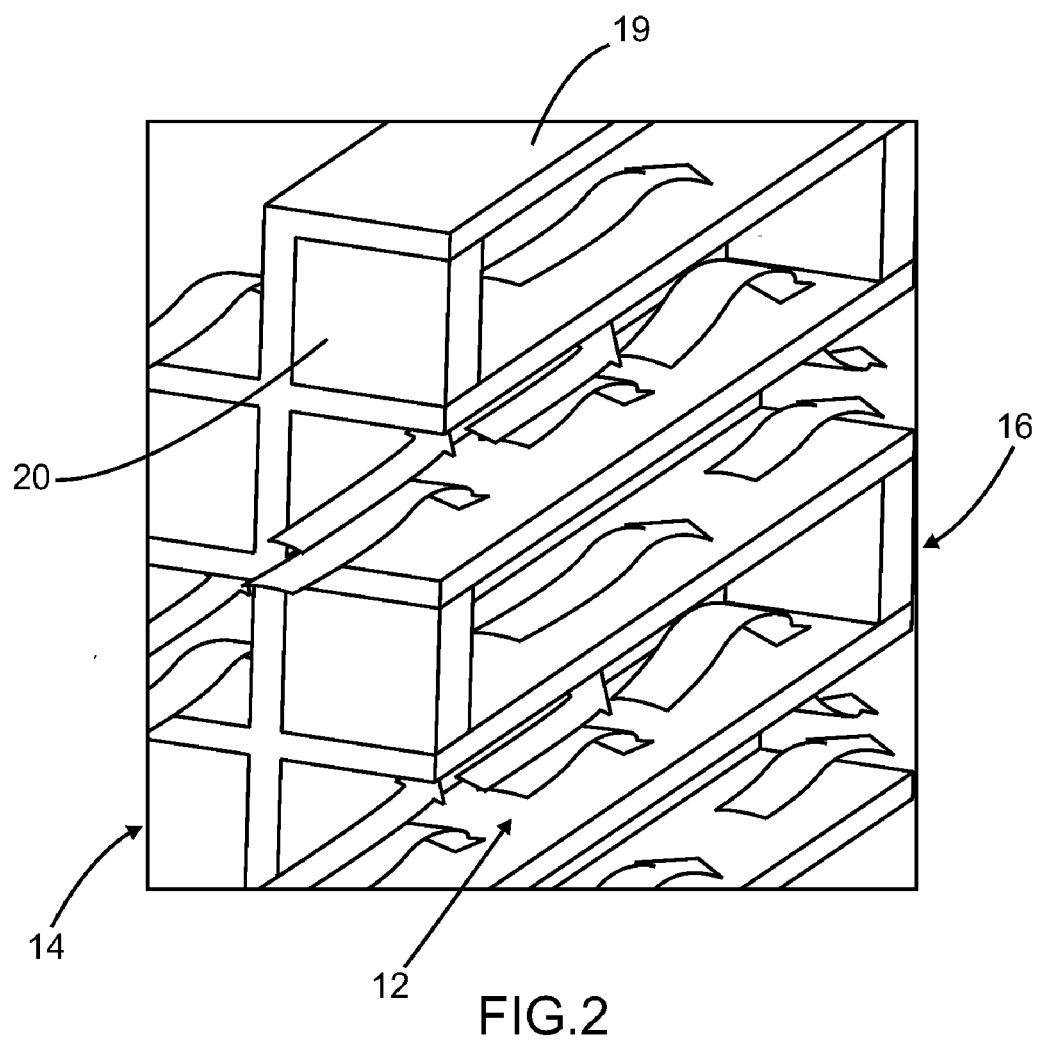
FIG. 2 illustrates channels of a diesel particulate filter, according to one embodiment of the invention.

As shown in FIG. 2, the channels 12 include walls 19 and are closed at some ends by means of plugs 20. Therefore, alternating plugged channels are provided at the first face 14 and second face 16 of the DPF 10. The presence of the plugs 20 forces the exhaust gas to flow through the walls of the honeycomb structure, thereby filtering particulates.

Figure 3:
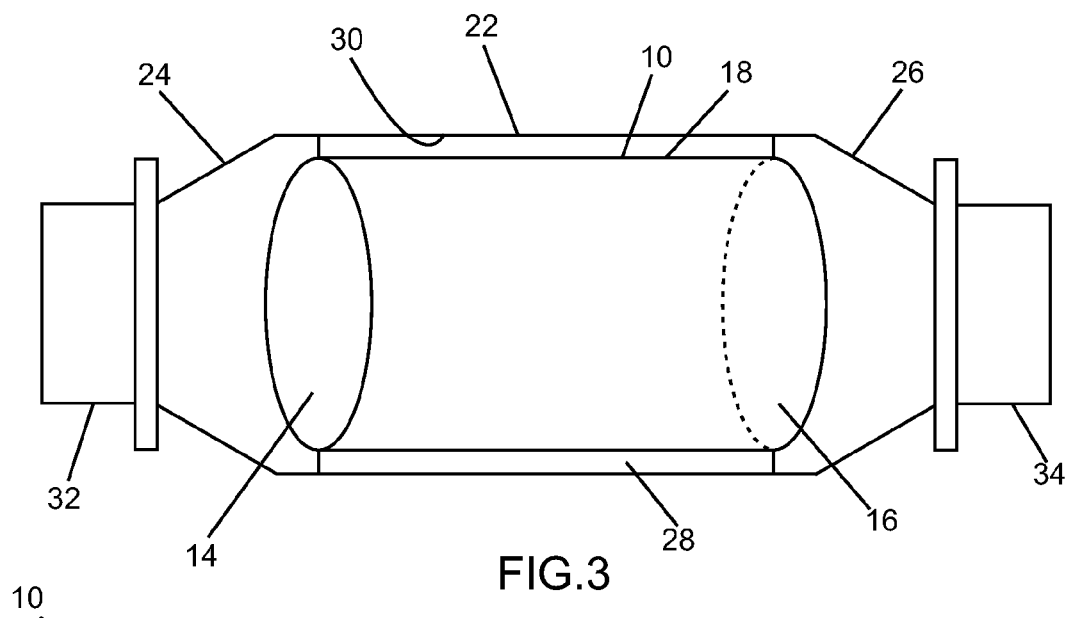
FIG. 3 illustrates a diesel particulate filter and housing, according to one embodiment of the invention.

Referring now to FIG. 3, the DPF is provided in a housing or casing 22 with a first end 24 and a second end 26. The first end 24 may be connected to an engine exhaust. A mat material 28 may be provided between an inner surface 30 of the casing 22 and the outer surface 18 of the DPF 10 for thermal insulation. The mat material 28 may have a thickness of about 10 mm to about 15 mm. A first exhaust pipe 32 is connected to the first end 24 of the housing 22. A second exhaust pipe 34 is connected to the second end 26 of the housing 22.

Figures 4A, 4B:
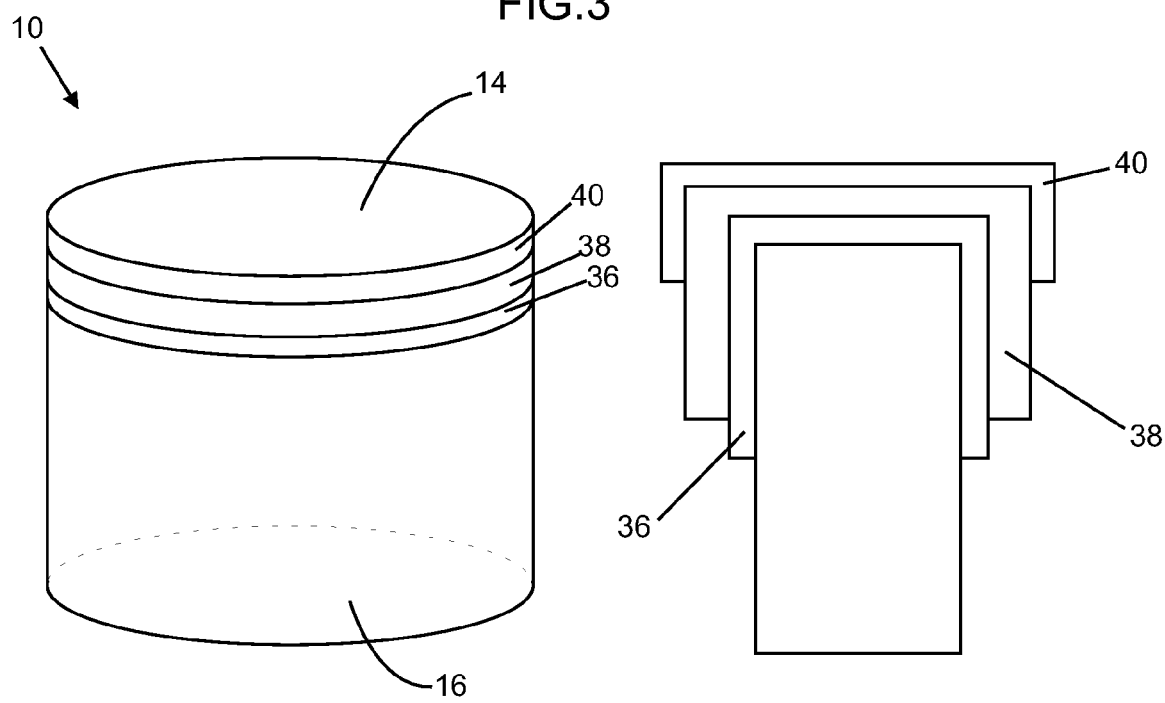
FIG. 4A illustrates three layers formed over the first face of the diesel particulate filter, according to one embodiment of the invention.
FIG. 4B is an enlarged, sectional view through a plugged channel over the first face of the diesel particulate filter, according to one embodiment of the invention.

As shown in FIG. 4A, in one embodiment of the invention, the DPF 10 comprises at least one layer over the first face 14 of the DPF 10. In one embodiment three layers are formed over the first face 14 of the DPF 10. The three layers may comprise a bottom electrode layer 36, a middle resistive layer 38, and a top electrode layer 40. This geometry according to one embodiment of the invention creates two equipotential surfaces within the honeycomb structure of the DPF 10 that serve as a positive electrode and a negative electrode. FIG. 4B is an enlarged, sectional view through the end of a plugged channel over the first face 14 of the DPF 10 and the bottom electrode layer 36, middle resistive layer 38, and top electrode layer 40.

The bottom electrode layer 36 may be a material with low resistivity. One example of a suitable bottom electrode layer is a metal, for example colloidal silver. The middle resistive layer 38 may be a resistive material capable of heating to a desired temperature, for example between about 550° C. and about 850° C., when a low voltage current, for example less than 42 V, is passed through it. The middle resistive layer 38 may be a metal or a semiconducting material. One example of a suitable middle resistive layer 38 is indium tin oxide. The top electrode layer 40 may be a material with low resistivity. The top electrode layer 40 may be a metal, for example colloidal silver.

Referring now to FIG. 4B, the middle resistive layer 38 may be formed such that the middle resistive layer 38 overlies a portion of the bottom electrode layer 36. The top electrode layer 40 may be formed such that the top electrode layer 40 overlies a portion of the middle resistive layer 38. In various embodiments, the top electrode layer 40 may have a thickness ranging from 50 μm to 500 μm, the middle resistive layer 38 may have a thickness ranging from 100 μm to 500 μm, and the bottom electrode layer 36 may have a thickness ranging from 50 μm to 500 μm. While these dimensions are preferred, it is understood that layer thicknesses outside these dimensions does not in any way change the intent or purpose of the invention.

Current flows from one electrode layer through the resistive middle layer to the other electrode layer. In one embodiment, the bottom electrode layer 36 may be the positive electrode and the top electrode layer 40 may be the negative electrode. In another embodiment, the bottom electrode layer 36 may be the negative electrode and the top electrode layer 40 may be the positive electrode. Current passing through the middle resistive layer 38 may generate Joule heating, which is proportional to the product of the (current)$^2$ and resistance.

Figure 5A:
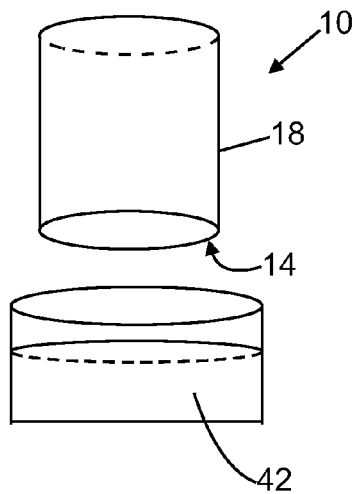
FIG. 5A illustrates a process of forming a first layer over the first face of the diesel particulate filter, according to one embodiment of the invention.

Referring now to FIG. 5A, one embodiment of the invention includes a method of forming at least one layer over the first face 14 of the DPF 10. The first face 14 of the DPF 10 may be dipped into a first solution 42 to a predetermined first depth, wherein the first solution 42 includes the bottom electrode layer material. The first solution 42 may comprise a metallic paint or slurry. The liquid vehicle and the viscosity of the first solution 42 may be selected to prevent the channels 12 from being blocked by the first solution 42. For example, the viscosity of the first solution may be about 1 to about 25 centipoise (cP). In one embodiment, a blocked channel 12 may be cleared by an air stream forced down the channel 12. Upon drying and consolidation, the dipping in the first solution 42 may result in a uniform bottom electrode layer 36 over the first face 14 of the DPF 10 and within the open channels over the first face 14 of the DPF 10. In one embodiment, the bottom electrode layer 36 may extend a first distance 46 from the first face 14 of the DPF 10 along the outer surface 18 of the DPF 10. For example, the first distance 46 may be, but is not limited to, approximately 3 cm to 4 cm. The thickness of the bottom electrode layer 36 may be sufficient such that a uniform potential across the entire area is achieved when a point-contact voltage is applied at any location along the surface.

Figure 5B:
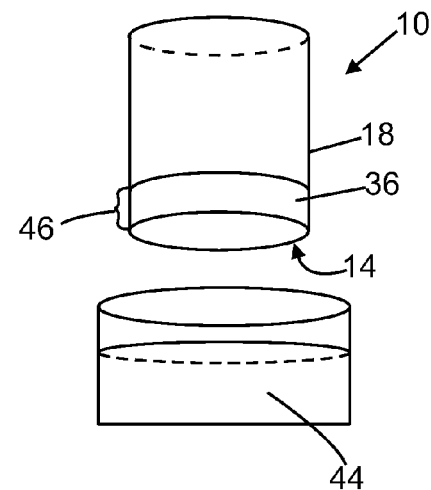
FIG. 5B illustrates a process of forming a second layer over the first face of the diesel particulate filter, according to one embodiment of the invention.

As shown in FIG. 5B, the first face 14 of the DPF 10 may be dipped into a second solution 44 to a predetermined second depth, wherein the second solution 44 includes the middle resistive layer material. In one embodiment, the second solution 44 may include, but is not limited to, a semiconductive material such as indium tin oxide. The liquid vehicle and the viscosity of the second solution 44 may be selected to prevent the channels 12 from being blocked by the second solution 44. For example, the viscosity of the second solution may be 1 to about 25 cP. In one embodiment, the second solution 44 is such that upon drying and consolidation, a uniform middle resistive layer 38 is formed over the first face 14 of the DPF 10 and within the channels 12 over the first face 14 of the DPF 10.

Figure 5C:
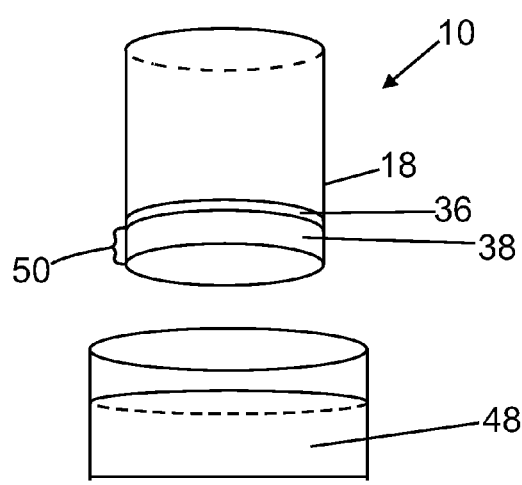
FIG. 5C illustrates a process of forming a third layer over the first face of the diesel particulate filter, according to one embodiment of the invention.

Referring now to FIG. 5C, in one embodiment, the middle resistive layer 38 may extend a second distance 50 from the first face 14 of the DPF 10 along the outer surface 18 of the DPF 10. For example, the second distance 50 may be, but is not limited to, approximately 2 cm to 3 cm. In one embodiment, the second distance 50 is less than the first distance 46. The middle resistive layer 38 is thereby formed over at least a portion of the bottom electrode layer 36. The middle resistive layer 38 should be free of porous defects to the extent that an applied current would not preferentially pass through the pores rather than through the thickness of the middle resistive layer 38 in order to avoid short circuits during operation. To achieve the proper quality and thickness of the middle resistive layer 38, it may be necessary to repeat the dipping of the first face 14 of the DPF 10 into the second solution 44 more than once. In one embodiment, the middle resistive layer 38 is not formed over the entire bottom electrode layer 36. In one embodiment, the second distance 50 is such that a portion of the bottom electrode layer 36 is exposed to allow for making isolated electrical contact to only the bottom electrode layer 36.

As shown in FIG. 5C, the first face 14 of the DPF 10 may be dipped into a third solution 48 to a predetermined third depth, wherein the third solution 48 includes a metallic paint or slurry. The liquid vehicle and the viscosity of the third solution 48 may be selected to prevent the third solution 48 from blocking the channels 12. For example, the viscosity of the third solution 48 may be about 1 to about 25 cP. The third solution 48 should be such that upon drying and consolidation, a uniform top electrode layer 40 is formed over the first face 14 of the DPF 10 and within the channels 12 over the first face 14 of the DPF 10.

Figure 5D:
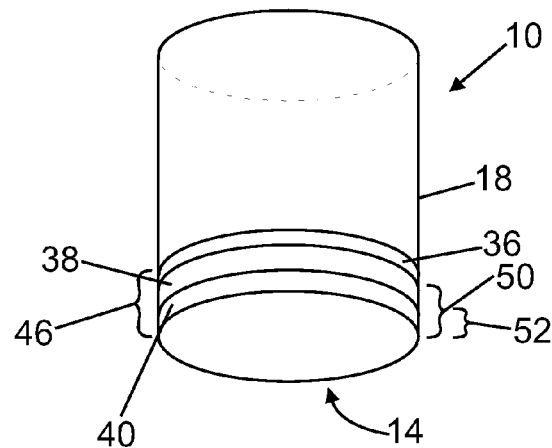
FIG. 5D illustrates a product including three layers over the first face of the diesel particulate filter, according to one embodiment of the invention.

Referring now to FIG. 5D, in one embodiment, the top electrode layer 40 may extend a third distance 52 from the first face 14 of the DPF 10 along the outer surface 18 of the DPF 10. For example, the third distance 52 may be, but is not limited to, approximately 1 cm to 2 cm. The top electrode layer 40 may be formed over at least a portion of the middle resistive layer 38. In one embodiment, the third distance 52 is less than the second distance 50. In another embodiment, the bottom electrode layer 36, the middle resistive layer 38, and the top electrode layer 40 are formed by a suitable method that is an alternative to dipping.

Figure 6:
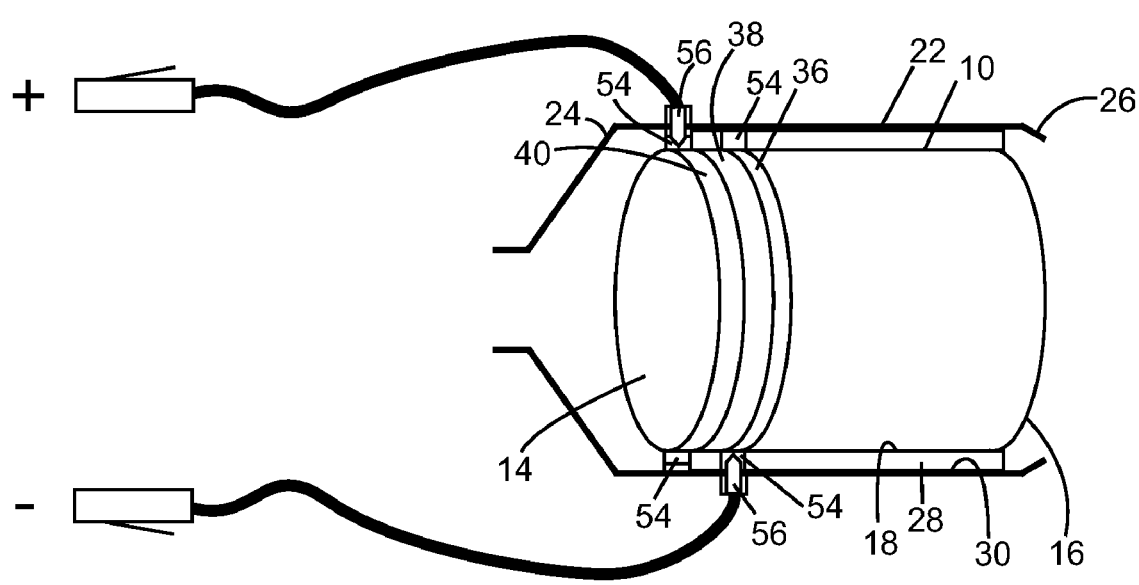
FIG. 6 illustrates the diesel particulate filter and housing, according to one embodiment of the invention.

In another embodiment shown in FIG. 6, the DPF 10 with three layers over the first face 14 of the DPF 10 may be provided in the housing or casing 22 with a first end 24 and a second end 26. Because the bottom electrode layer 36, the middle resistive layer 38, and the top electrode layer 40 may be uniformly formed over the first face 14 of the DPF 10, cold spots over the DPF during regeneration may be eliminated and the regeneration process maximized. An electrically conductive seal 54 may be provided in a band around each of the top electrode layer 36 and bottom electrode layer 40 to facilitate electrical contact. The electrically conductive seal 54 may be a high temperature, electrically conductive seal, for example, a Grafoil seal available from American Seal and Packing. The mat material 28 may be provided between the inner surface 30 of the casing 22 and the outer surface 18 of the DPF for thermal insulation. The mat material 28 may have a thickness of about 2 mm to about 5 mm. Electrical connections 56 may be attached to each of the top electrode layer 36 and the bottom electrode layer 40. The electrical connections 56 may power and initiate the regeneration of the DPF 10.

In one embodiment, a method is provided for regenerating the DPF 10 to burn the soot that has accumulated inside the DPF 10. The first face 14 of the DPF 10 may be electrically heated to the soot combustion temperature. The middle resistive layer 38 is heated when electric current flows from one electrode layer to the other electrode layer. The exhaust gas from the diesel engine may enter the DPF 10 through the first exhaust pipe 32 and through the open channels 12 over the first face 14 of the DPF 10. Heat from the exothermic combustion of the soot in proximity to the first face 14 of the DPF 10 propagates the soot combustion event down each channel 12 of the DPF. The exhaust gas and gas from particulate combustion passes through the walls 19 of the channels 14, while the soot contained in the exhaust gas cannot pass through the walls 19. The soot is trapped by the walls 19. The purified exhaust gas travels through the open channels 14 over the second face 16 of the DPF 10 and exits the DPF 10 through the second exhaust pipe 34.

In various embodiments, the resistive layer may be indium tin oxide (ITO) and the sample electrodes may be colloidal silver. In other embodiments, the resistive layer may be any material that demonstrates significant Joule heating while passing current. In one embodiment, the DPF regeneration system is applied to a vehicle. For automotive applications, the power may be provided by a standard electrical generator operating between 12V and 42 V. For this voltage condition, if the coated surface area of the DPF is on the order of 1500-2000 $cm^2$, and the middle resistive layer 38 is about 100 μm thick, the required resistivity for the resistive layer material may be about 1-100 $\Omega\text{-cm}^2$. Many materials or combinations of materials may be formulated to provide this and other required properties for the resistive layer.

The description of the invention is merely exemplary in nature and, thus, variations thereof are not to be regarded as a departure from the spirit and scope of the invention.

What is claimed is:

1. A process comprising:
   first, dipping a first face of a diesel particulate filter into a first solution to a predetermined first depth, wherein the first solution comprises a first electrically conductive material;
   drying the first face of the diesel particulate filter to form a bottom electrode layer;
   second, after said drying the first face of the diesel particulate filter to form a bottom electrode layer, dipping the first face of the diesel particulate filter into a second solution to a predetermined second depth, wherein the second solution comprises an electrically resistive material;
   drying the first face of the diesel particulate filter to form a middle resistive layer overlying the bottom electrode layer;
   third, after drying the first face of the diesel particulate filter to form a middle resistive layer overlying the bottom electrode layer, dipping the first face of the diesel particulate filter into a third solution to a predetermined third depth, wherein the third solution comprises a second electrically conductive material; and
   drying the first face of the diesel particulate filter to form a top electrode layer overlying the bottom electrode layer and the middle resistive layer.

2. The method of claim 1 wherein the first solution comprises a metallic paint or slurry.

3. The method of claim 1 wherein the second solution comprises indium tin oxide.

4. The method of claim 1 wherein the third solution comprises a metallic paint or slurry.

5. The method of claim 1 wherein the predetermined second depth is less than the predetermined first depth.

6. The method of claim 1 wherein the predetermined third depth is less than the predetermined second depth.

7. The method of claim 1 wherein the middle resistive layer comprises a semiconductive material.

8. The method of claim 1 wherein the middle resistive layer is constructed and arranged to heat the filter to a temperature of at least 550° C.

* * * * *